(12) United States Patent
Becker et al.

(10) Patent No.: US 8,926,292 B2
(45) Date of Patent: Jan. 6, 2015

(54) NOZZLE INSERT FOR BOOSTING PUMP INLET PRESSURE

(75) Inventors: Lee J. Becker, Canton, MI (US);
Charles M. Robeck, Farmington Hills, MI (US); Mark K. Quinn, Novi, MI (US); Eric G. Robertson, Southfield, MI (US); John W. Fallu, Livonia, MI (US); Mark R. Dobson, Howell, MI (US); Jason K. Mazur, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1399 days.

(21) Appl. No.: 12/466,443

(22) Filed: May 15, 2009

(65) Prior Publication Data

US 2010/0290924 A1 Nov. 18, 2010

(51) Int. Cl.
*F04B 23/08* (2006.01)
*F04F 5/54* (2006.01)
*F16H 57/04* (2010.01)

(52) U.S. Cl.
CPC . *F04B 23/08* (2013.01); *F04F 5/54* (2013.01); *F04C 2250/101* (2013.01); *F16H 57/0434* (2013.01); *F16H 57/0438* (2013.01)
USPC ............................... 417/89; 417/151; 417/198

(58) Field of Classification Search
USPC ............................................ 417/89, 151, 198
See application file for complete search history.

(56) References Cited

U.S. PATENT DOCUMENTS

| 5,878,632 | A | 3/1999 | Hubler et al. | |
|---|---|---|---|---|
| 6,155,793 | A | 12/2000 | Tuckey et al. | |
| 6,405,717 | B1 | 6/2002 | Beyer et al. | |
| 7,192,257 | B2 | 3/2007 | Becker et al. | |
| 2006/0018767 | A1* | 1/2006 | Schultz et al. | 417/313 |
| 2007/0217922 | A1* | 9/2007 | Braun et al. | 417/198 |
| 2007/0248469 | A1 | 10/2007 | Volk et al. | |

* cited by examiner

*Primary Examiner* — Andrew Coughlin
(74) *Attorney, Agent, or Firm* — James Dottavio; MacMillan, Sobanski & Todd, LLC

(57) ABSTRACT

A pump assembly includes a pump housing including an inner surface, a pump inlet and an excess flow passage, a filter assembly including a spout extending into the housing, and an insert located within and secured to the housing, and including a first surface spaced from the inner surface and producing therebetween an annular nozzle communicating with said excess flow passage, the nozzle directing a first fluid stream exiting the excess flow passage toward a second fluid stream exiting the spout, the fluid streams flowing toward the pump inlet.

6 Claims, 5 Drawing Sheets

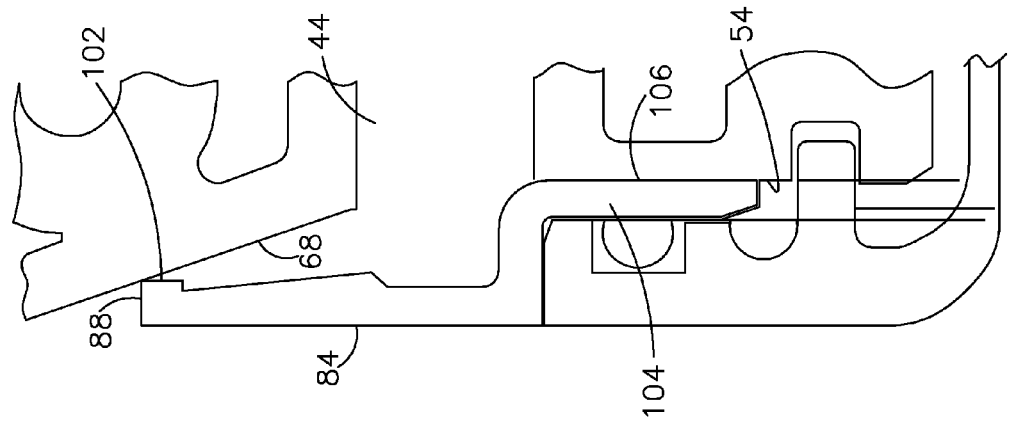
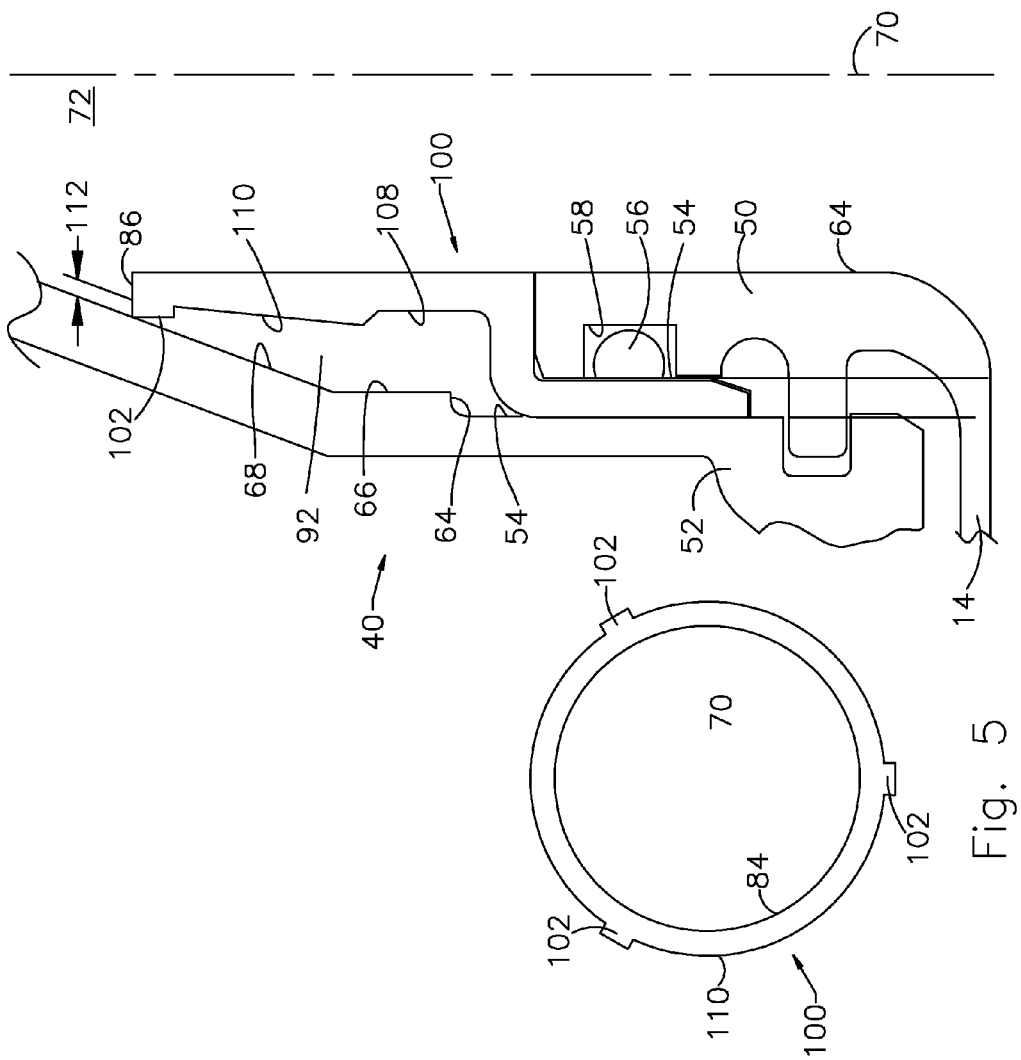

NOZZLE INSERT FOR BOOSTING PUMP INLET PRESSURE

BACKGROUND OF THE INVENTION

1. Field of the Invention

This invention relates generally to the field of hydraulic pumps. In particular, the invention pertains to a nozzle for boosting pump inlet pressure using excess recirculation oil flow in an automatic transmission.

2. Description of the Prior Art

Positive displacement hydraulic pumps often operate at variable speeds, especially when the pump is in a vehicle power steering system or a vehicle automatic transmission. The pump is driven by the vehicle engine and therefore must operate through the entire engine speed range. The speed at which the pump is driven can exceed 6000 rpm.

A fixed displacement pump produces more flow than needed at high speed, the excess flow being routed to the pump inlet and bypassing a pump filter.

Fixed displacement pumps used in automatic transmissions typically reach a speed at which the supply pressure is insufficient to force fluid into the pumping volume during the intake period. This lack of fluid cavitates the pumping chamber causing reduction in flow volume, durability wear due to cavitation implosions, and the production of cavitation noise, which is objectionable to the vehicle occupants.

A need exists for a jet pump nozzle that is retained in position with a controlled gap that provides fluid velocities required of an effective jet pump nozzle.

SUMMARY OF THE INVENTION

A pump assembly includes a pump housing including an inner surface, a pump inlet and an excess flow passage, a filter assembly including a spout extending into the housing, and an insert located within and secured to the housing, and including a first surface spaced from the inner surface and producing therebetween an annular nozzle communicating with said excess flow passage, the nozzle directing a first fluid stream exiting the excess flow passage toward a second fluid stream exiting the spout, the fluid streams flowing toward the pump inlet.

Flow exits the nozzle at a high velocity relative to that of make-up oil drawn from the sump. The mixed flow from the sump and excess flow through the nozzle produces an elevated pump inlet pressure, which elevates the pump speed at which cavitation occurs.

The nozzle reduces pump noise across a range of speeds and temperatures. It improves the controllability of the hydraulic control elements using pump oil by reducing air in the oil.

Erosion wear of the pump inlet surfaces is reduced producing longer pump life and less fluid borne contamination.

The annular nozzle is quite effective in boosting pressure at the pump inlet to delay the onset of cavitation. These nozzle inserts can be contained in a housing used in any fixed displacement pump application, such as an automobile automatic transmission, where the rate of flow required to fill the pump at higher speeds exceeds the rate of flow provided by the available atmospheric pressure head.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 4 is a cross section taken at a diametric plane through a second embodiment of the nozzle assembly;

FIG. 5 is an end view of the nozzle insert of FIG. 4; and

DESCRIPTION OF THE PREFERRED EMBODIMENT

Figure 1:
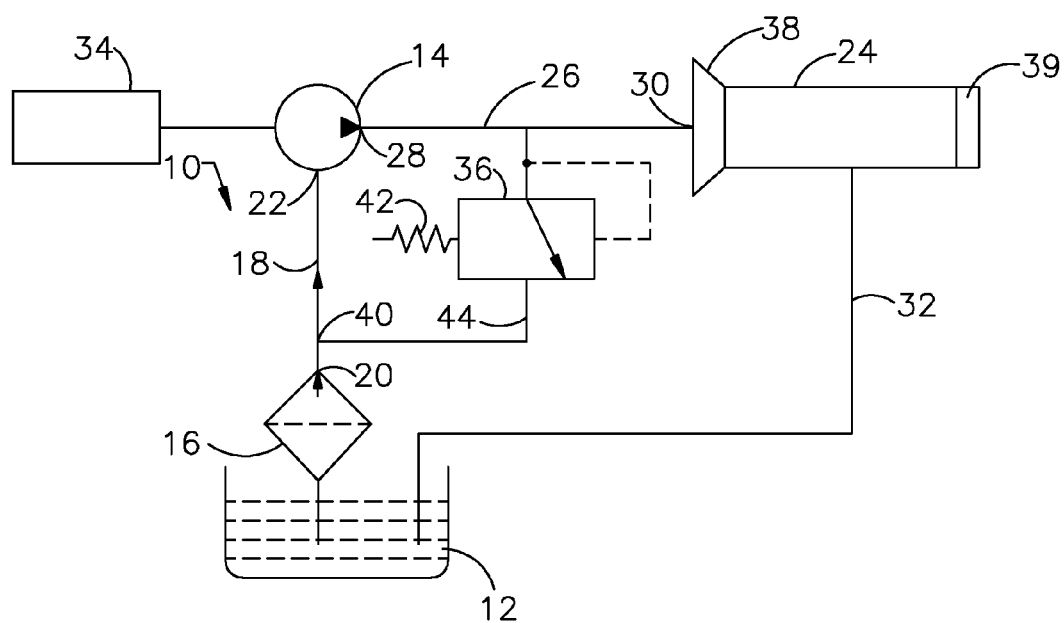
FIG. 1 is a schematic diagram showing a hydraulic system.

Referring now to the drawings, FIG. 1 shows a schematic diagram of a hydraulic system 10, which includes a sump 12 containing hydraulic fluid at relatively low pressure; a pump 14; a fluid filter assembly 16; a line 18 for hydraulically connecting the filter's outlet 20 and the pump's inlet 22; a transmission 24, a supply line 26 for hydraulically connecting the pump's outlet 28 and the transmission's inlet 30; a passage 32 for returning lubricant and leakage flow from the transmission 24 to the source 12; an engine 34; and a pressure regulator valve 36 connecting line 26 and line 18.

The transmission 24 includes a torque converter 38 and a lubrication and cooling circuit 39. Engine 34 drives torque converter 38 and pump 14 at a variable rotational speed.

Pump 14, which draws fluid from the sump 12 through filter 16, delivers pressurized hydraulic fluid to the transmission 24.

Regulator valve 36 regulates pressure at the pump outlet to a desired pressure, in response to a balance of opposed forces on the valve produced by a spring 42, a variable force produced by a controlled pressure acting in the same direction as spring 42, and a force produced by pressure in supply line 26.

Regulator valve 36 returns excess flow from the pump outlet 28 preferably to the nozzle assembly 40, provided that the flow rate in line 26 first satisfies the requirements of (i) the transmission 24, (ii) torque converter 38, and (iii) lube and cooling circuit 39.

The excess flow is delivered through a bypass flow passage 44 from the pressure regulator valve 36 to the nozzle assembly 40. The bypassed fluid is carried in passage 44 at relatively a high velocity and an elevated pressure greater than pressure in the sump 12, which is substantially at atmospheric pressure.

Figure 2:
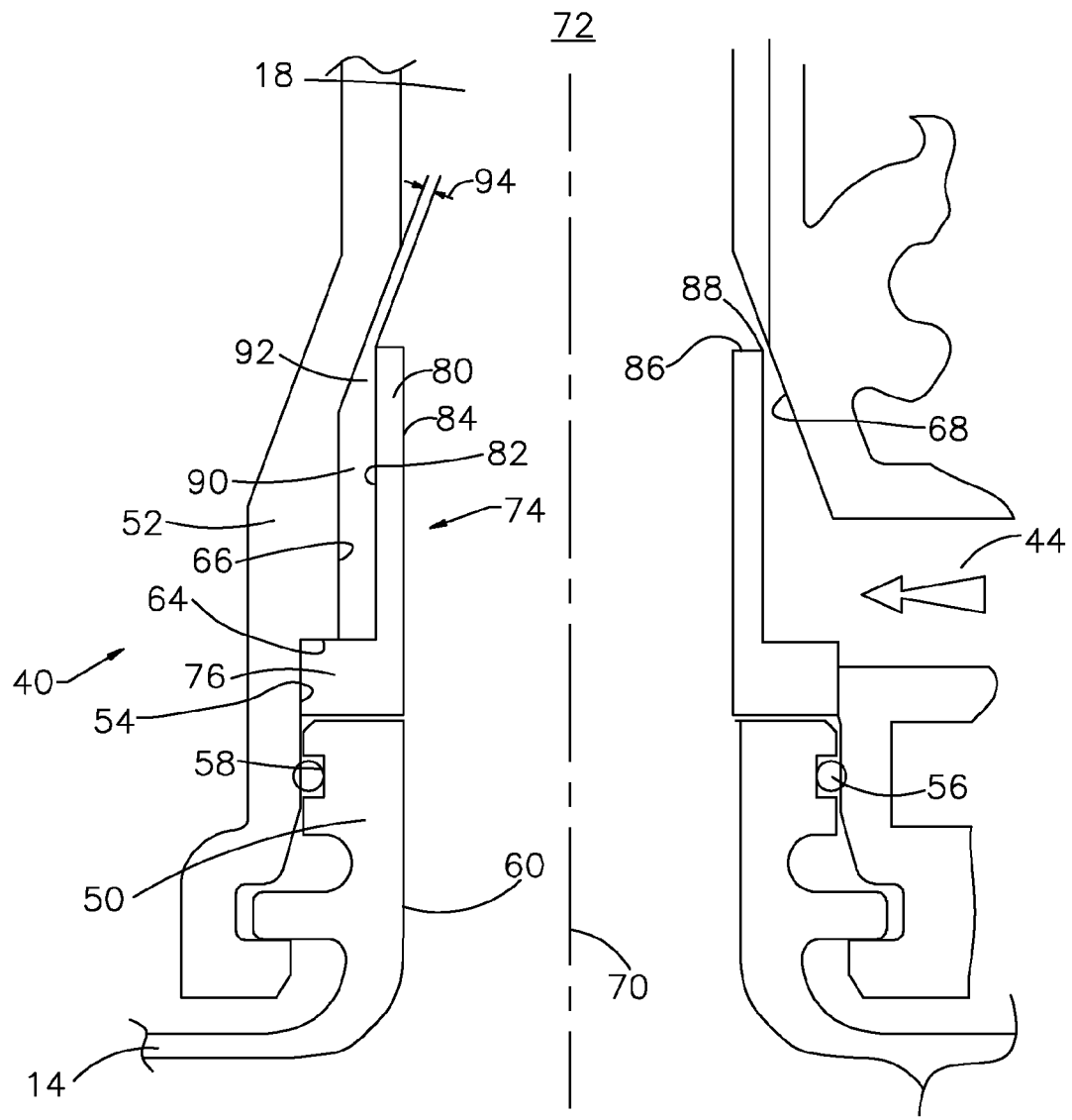
FIG. 2 is a cross section taken at a diametric plane through a first embodiment of the nozzle assembly.
Figure 3:
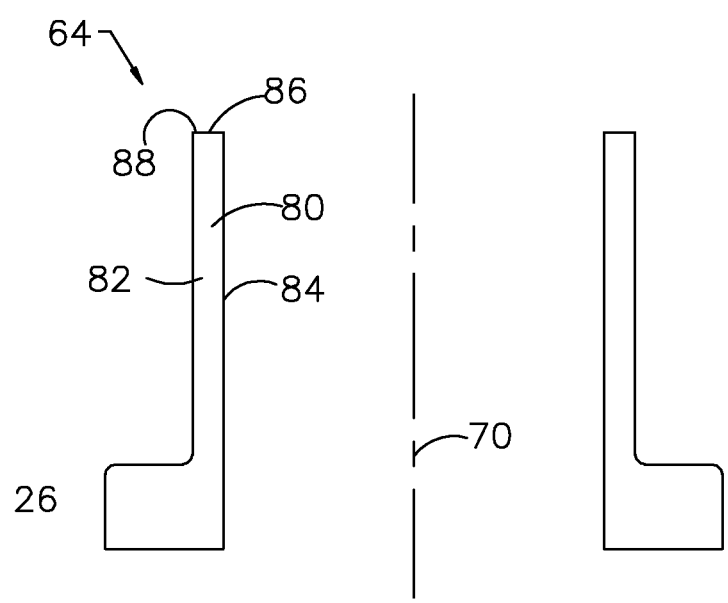
FIG. 3 is a cross section taken at a diametric plane through the insert of FIG. 2.

FIG. 2 shows the components in the vicinity of the nozzle assembly 40. The outlet 20 of filter assembly 16 is formed with a spout 50, which is fitted into a pump inlet housing 52 and sealed against the inner surface 54 of housing 52 in this illustration by an O-ring 56, retained in a recess 58 in the spout 50. The inner surface 60 of spout 50 is essentially sized to match the inner surface 84 of nozzle insert 74 to reduce flow losses from rapid expansions or contractions.

The pump inlet housing 52 is formed with a shoulder 64, a circular cylindrical inner surface 66, and a conical inner surface 68 aligned with axis 70. Housing 52 also contains a fluid mixing chamber 72 located downstream from the filter assembly 14.

FIG. 2 shows a nozzle insert 74 having a flange 76, which abuts shoulder 64 to establish its axial position in housing 52, and which is fitted with a press-fit against a cylindrical inner surface 54 coaxial with axis 70, thereby securing the insert in position within housing 52. Insert 74 includes hollow circular cylinder 80 extending axially downstream from flange 76 and bounded by an outer circular cylindrical surface 82 and an inner circular cylindrical surface 84. An end surface 86 of insert nozzle 74 is preferably flat and formed with a circular outer edge 88. The shape and size of the nozzle exit 94 is formed from the relative locations of the circular outer edge 88 and the conical inner surface 68.

In operation, fluid drawn from the fluid sump 12 enters the nozzle assembly 40 through the central opening 60 of the filter assembly 14 and flows along axis 70 toward fluid mixing chamber 72. Excess fluid, carried in passage 44, enters pump inlet housing 52 radially and spirals around the outer surface of the nozzle insert 74, flows axially in an annular passage 90 between cylindrical surfaces 66, 82, flows into the nozzle passage 92 created by conical surface 68 and cylindrical surface 82, and through the annular nozzle exit 94, located between surface 68 and the circular outer edge 88 of nozzle insert 74. The cross sectional area of the nozzle passage 92 decreases and velocity of the flow in passage 92 increases as distance from fluid mixing chamber 72 decreases. The flow exiting through nozzle exit 94, creates a mixing vortex in the fluid mixing chamber 72 with the flow drawn from the fluid sump 12, whereupon the combined fluid volume travels through the fluid mixing chamber 72 and enters the pump 14 at inlet 22.

FIGS. 4 and 5 illustrate an alternate embodiment, in which the axial position of a nozzle insert 100 is established by contact of three angularly spaced nubs 102, located at an axial end of the insert, and the conical inner surface 68 of the pump inlet housing 52. The nozzle insert 100 includes a cylindrical portion 104, whose outer cylindrical surface 106 is adjacent to and guided toward its correct position along the cylindrical inner surface 54 of pump inlet housing 52. The outer surface 106 of nozzle insert 100 is bonded to the cylindrical inner surface 54 of pump inlet housing 52 using an adhesive.

After the nozzle insert 100 is installed in housing 52, the filter assembly is installed in housing 52 and sealed against the inner surface 54 of the housing by an O-ring 56, retained in a recess 58 in the spout 50.

Fluid drawn from the fluid sump 12 enters the nozzle assembly 40 through the central opening 60 of the filter assembly 14 and flows along axis 70 toward fluid mixing chamber 72. Excess fluid, carried in passage 44, enters pump inlet housing 52 radially and spirals around the outer surface 108 of the nozzle insert 100, flows axially in an annular nozzle passage 92 between the inner conical surface 68 of the housing and an outer conical surface 110 of nozzle insert 100 and through a nozzle exit 112 between surfaces 68 and 110 at the axial end of the nozzle insert. Upon exiting through nozzle exit 112, the excess flow creates a mixing vortex in the fluid mixing chamber 72 with the flow drawn from the fluid sump 12, whereupon the combined fluid volume travels through the mixing chamber 72 and enters the pump 14 at inlet 22.

Figure 6:
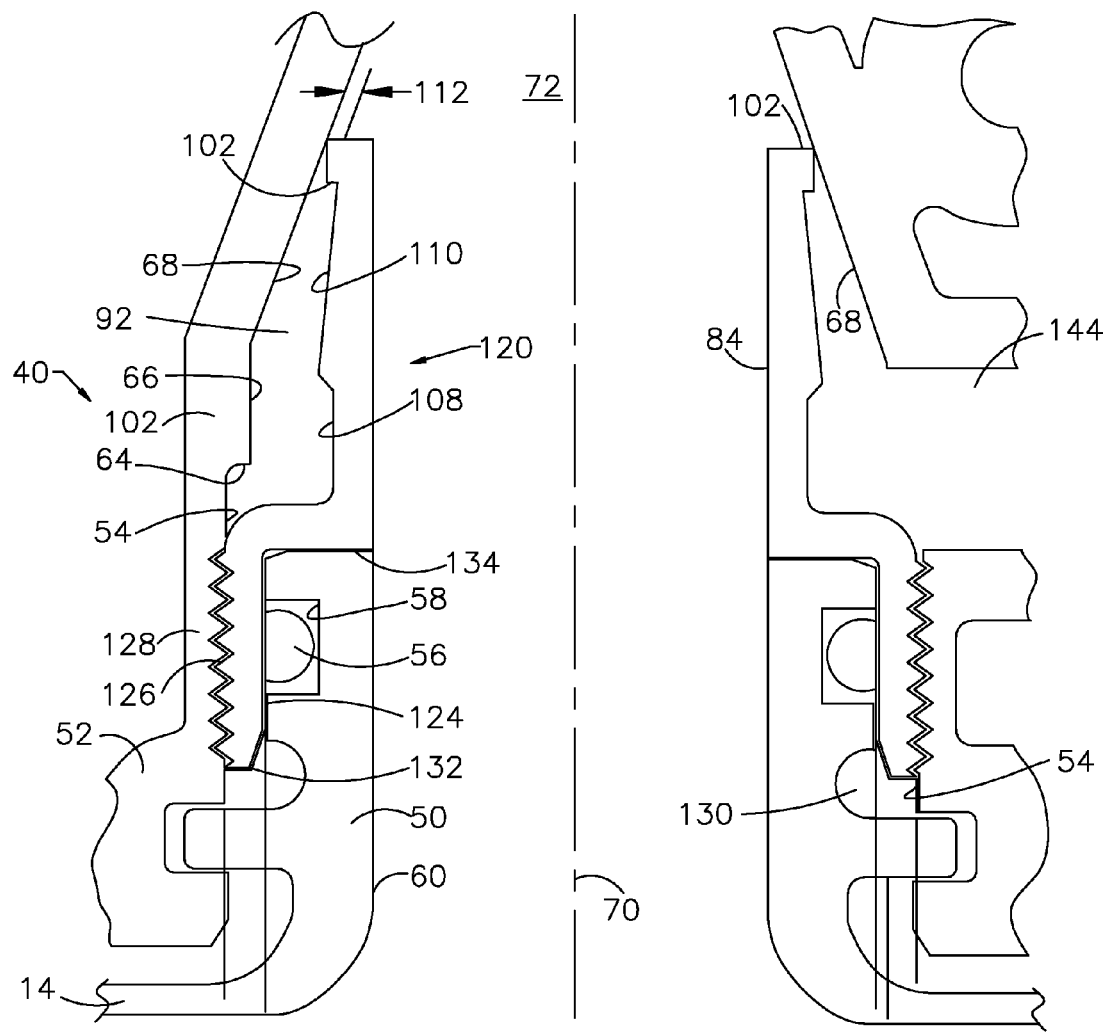
FIG. 6 is a cross section taken at a diametric plane through a third embodiment of the nozzle assembly.

FIG. 6 shows an alternate embodiment, in which the axial position of the nozzle insert 120 is established by contact between the nubs 102 and the conical inner surface 68 of the pump inlet housing 52. The nozzle insert 120 includes a cylindrical portion 124, whose outer cylindrical surface is formed with threads 126, which engage threads formed on the inner surface of a cylindrical portion 128 of housing 52. In this way, nozzle insert 120 is retained in its correct position in the pump inlet housing 52.

The axial position of the nozzle insert 120 can be established by applying an axially-directed elastic force to the insert urging the nubs 102 into contact with the conical inner surface 68 of the pump inlet housing 52. Additional methods of retaining the nubs against the conical inner surface 68 of the pump inlet housing 52 can be a force applied by a lock washer, a wavy snap ring, or compression spring 130 located between the filter assembly 14 and one of the surfaces 132, 134 of the nozzle insert 120. Additionally a press fit, as illustrated in FIG. 2 could be employed. In these ways, nozzle inserts 74, 100, 120 are retained in the correct position in the pump inlet housing 52 to provide precise control of nozzle exit 94, 112.

Preferably the spout 50 of filter assembly 14 is of molded plastic, the pump housing 52 is of cast aluminum alloy, and the nozzle inserts 74, 100, 120 are of anodized machined aluminum alloy or hardened powder metal.

In accordance with the provisions of the patent statutes, the preferred embodiment has been described. However, it should be noted that the alternate embodiments can be practiced otherwise than as specifically illustrated and described.

The invention claimed is:

1. A pump assembly comprising:
a housing including a conical inner surface and an excess flow passage;
a spout directing a fluid stream into the housing;
an insert press-fittingly secured to the housing, including a cylindrical outer surface and an end surface forming an edge at said outer surface, the edge spaced from said inner surface and producing therebetween a nozzle directing a first fluid stream from the excess flow passage toward said fluid stream.

2. The pump assembly of claim 1, wherein:
the inner surface is a conical surface inclined inward and toward a pump inlet, producing a space between the inner surface and the cylindrical outer surface, the space having a cross sectional area that decreases as distance from the pump inlet decreases.

3. The pump assembly of claim 1, wherein:
the inner surface is a conical surface inclined inward and toward a pump inlet; and further comprising:
a flange that contacts a shoulder formed on the housing, said contact establishing a position of the insert in the housing;
the cylindrical outer surface extends away from the flange, along an axis toward the pump inlet; and
the end surface intersecting the cylindrical outer surface and forming a circular outer edge.

4. A pump assembly comprising:
a housing including a conical inner surface and an excess flow passage;
a spout directing a fluid stream into the housing;
an insert press-fittingly secured to the housing, including a cylindrical outer surface, spaced nubs extending outward from said outer surface into contact with the inner surface, and an end surface forming an edge at said outer surface, the edge spaced from said inner surface and producing therebetween a nozzle directing a first fluid stream from the excess flow passage toward said fluid stream.

5. The pump assembly of claim 4, wherein:
the inner surface is a conical surface inclined inward and toward a pump inlet, producing a space between the inner surface and the cylindrical outer surface, the space having a cross sectional area that decreases as distance from the pump inlet decreases.

6. The pump assembly of claim 4, wherein:

the inner surface is a conical surface inclined inward and toward a pump inlet; and further comprising:

the cylindrical outer surface extends along an axis toward the pump inlet; and the end surface intersects the cylindrical outer surface and forms a circular outer edge.

\* \* \* \* \*